| United States Patent [19] | [11] Patent Number: 4,734,891 |
| McGowan et al. | [45] Date of Patent: Mar. 29, 1988 |

[54] AFT DROGUE MODULE FOR TOWED SONAR ARRAY

[75] Inventors: George A. McGowan, Westminster; David B. MacCulloch, Saugus, both of Calif.

[73] Assignee: Hughes Aircraft Company, Los Angeles, Calif.

[21] Appl. No.: 876,611

[22] Filed: Jun. 20, 1986

[51] Int. Cl.⁴ .............................................. G01V 1/38
[52] U.S. Cl. ..................................... 367/15; 181/110; 367/106
[58] Field of Search ................. 367/106, 20, 16–18, 367/15; 138/126; 254/372; 114/242, 244, 245, 246; 181/110

[56] References Cited

U.S. PATENT DOCUMENTS 3,287,691 11/1966 Savit ........................................ 367/16
3,885,515  5/1975 Caldwell, Jr. et al. ................ 367/16
4,513,681  4/1985 Crook, Jr. .............................. 254/372
4,585,035  4/1986 Piccoli .................................... 138/126
4,597,065  6/1986 Lien et al. ............................... 367/20

Primary Examiner—Thomas H. Tarcza
Assistant Examiner—Daniel T. Pihulic
Attorney, Agent, or Firm—Thomas A. Runk; Anthony W. Karambelas

[57] ABSTRACT

The aft drogue module (18) of the towed sonar array has a body (20) as its main length. The body (20) contains strength member (26) which is covered by an extruded tube (28) of rubberlike material which is covered by braid (30) and which, in turn, is covered by extruded abrasion-resistant cover sleeve (32). At its forward end, the strength member is expanded into the conical interior of coupling (22). The tail (56) is attached to the body and contains fill material (60) which damps and is sufficiently stiff to inhibit whipping during towing.

19 Claims, 5 Drawing Figures

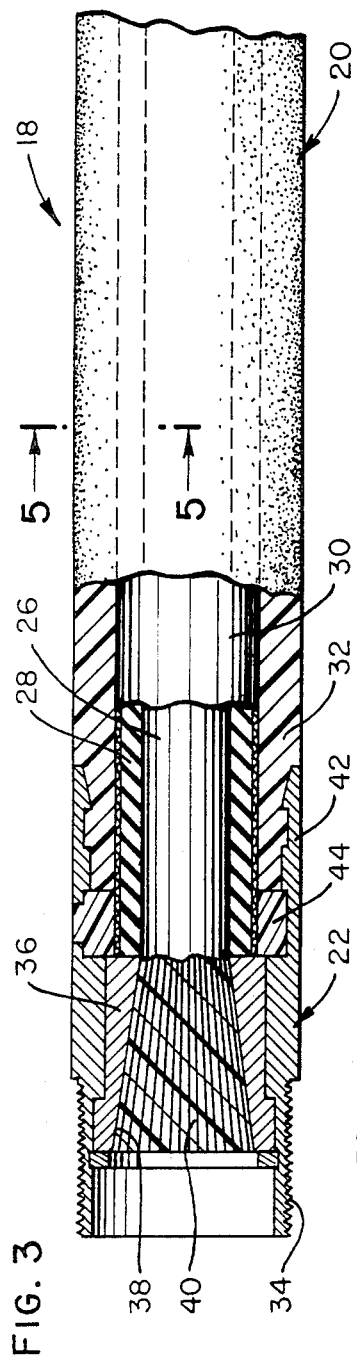
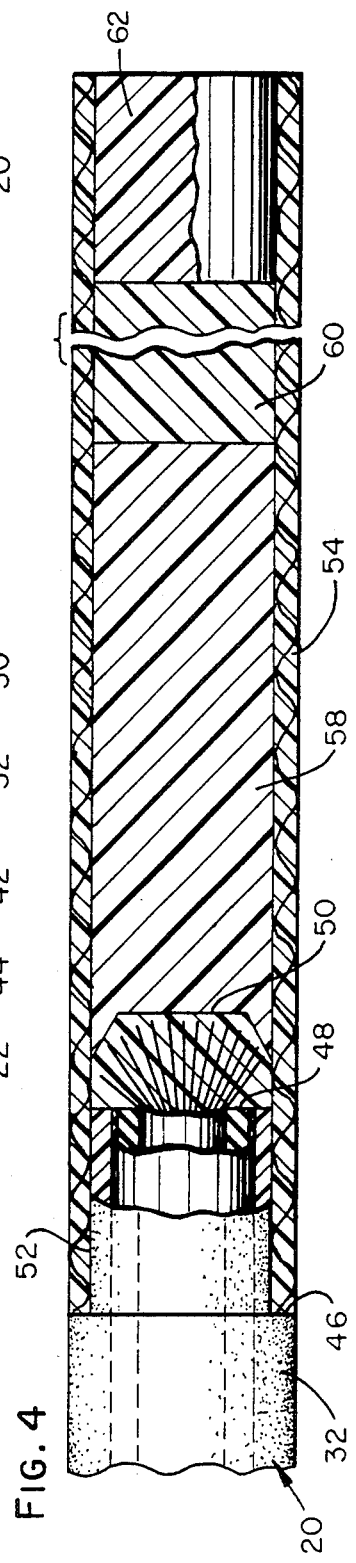
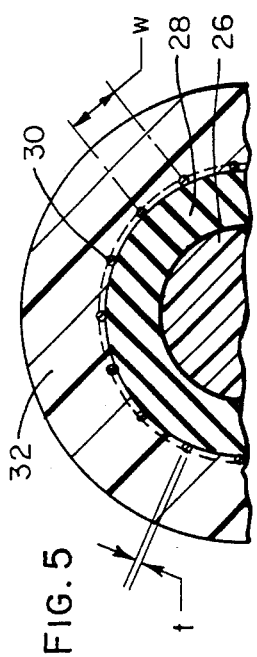
FIG. 3
FIG. 4
FIG. 5

AFT DROGUE MODULE FOR TOWED SONAR ARRAY

The Government of the United States of America has rights in this invention pursuant to Contract No. N00024-80-C-6347 awarded by the Department of the Navy.

BACKGROUND OF THE INVENTION

This invention relates to a sonar towed array and, more particularly, to the aft drogue module for a high-strength, thin-line towed sonar array.

Generally, sonar arrays are towed up to a mile or so behind the towing vessel. The towed array is deployed by unwinding it from the spool of a winch, on which it is stowed when not in use. The array may be on the order of 1,500 feet in length and 1 inch in diameter, and is generally made in sections or modules of about 90 feet in length, which are joined together by means of an electromechanical coupling. An internal strength member runs the length of each module and functions to carry the tensile load on each module, mainly caused by drag of the array as it is towed.

The strength member in each module carries the principal accumulated stress of the array. Each strength member must be connected to a termination member to transfer the tensile load of the strength member to the electro-mechanical coupling at each end of a module. The tensile load of each module is thus successively transferred to the next forward module, until the entire load of the array is passed through the forwardmost strength member termination and electromechanical coupling to a steel tow cable and thence to a towing vessel.

Some modules are acoustic modules and contain sensitive acoustic sensors. In order to provide space for the sensors and to prevent unwanted acoustic signals from being passed to these sensors, a flat or ribbon-type strength member is employed in the acoustic modules. This ribbon-type strength member is arranged inside the walls of the tubular jacket of the module so that it does not have mechanical contact with the sensors, to minimize the transfer of unwanted acoustic signals.

Vibration isolation modules function to mechanically isolate the acoustic-type modules from vibrations of the towing vessel. This results in reducing the transfer of unwanted acoustic signals to the acoustic sensors contained in the acoustic modules. The vibration isolation modules contain no acoustic sensors, and, therefore, can use a more economical braided-rope type or round-strength member, rather than the lower-profile flat, ribbon-type strength member which provides space for the sensors.

Kevlar, a synthetic material produced by E. I. DuPont de Nemours & Co., is frequently used as the strength member in military and commercial towed sonar and sounding arrays. See U.S. Pat. No. 4,160,229 to McGough and U.S. Pat. No. 4,090,168 to Miller, et al. Kevlar is an aramid, which is the generic name for a distinctive class of aromatic polyamide fibers. Kevlar has an extremely high tensile strength and greater resistance to elongation than steel. Although Kevlar is very strong in tension, it is subject to damage by being compressed, kinked, cut or bent around a tight radius.

Uneven lengths of the Kevlar strength member ribbons, common with this type of termination, cause one of the ribbons to take a disproportionate share of the load, resulting in early failure. Also, during winching operations where the pull is not straight, the Kevlar ribbons may be bent and pulled taut over a sharp edge or a tight radius, causing damage to the Kevlar strength member.

Each strength member transfers its tensile load to a termination member, and the termination member, in turn, transfers its tensile load to the coupling so that the coupling serves as a tensile coupler. In addition, the coupling serves to house and retain the electrical plug in the receptacle by which the required electrical connections are made.

The module which terminates the after end of the towed sonar array has different requirements. It contains no electrical components and thus does not need electrical connection. The after module must be stiff enough to be able to be thrust out through an exit guide tube and, once in the stream behind the moving vessel, it must provide sufficient drag to assist in deploying the balance of the array. When the array is fully deployed, the aft drogue module must be near neutral buoyancy to maintain the proper tow profile. Also, while being towed it must dampen whipping and strumming of the aft end of the towed array. In order to achieve these needs, a novel aft drogue module is required.

SUMMARY OF THE INVENTION

In order to aid in the understanding of this invention, it can be stated in essentially summary form that it is directed to a drogue module for the after end of a towed sonar array wherein the body is formed of a multiple layer extrusion having therein a rope strength member and extrusion materials such as to provide stiffness, with deterioration resistance and strength in connection with proper density to provide a suitable drogue.

It is, thus, a prupose and advantage of this invention to provide a drogue module which has an interior rope for strength, over which is extruded thermoplastic rubberlike material and over which is extruded polyurethane so that the rubber acts as a stiffener and dampening material and the polyurethane acts as a wear-resistant outer surface.

It is another purpose and advantage of this invention to provide an aft drogue module which has sufficient stiffness for ready deployment, and creates sufficient drag loads to assist in deploying the balance of the array.

It is a further purpose and advantage of this inventiontprovide an aft drogue module for a towed sonar array which is near neutral buoyancy in sea water to maintain a proper tow profile and, furthermore, provides dynamic stabilization to dampen whipping and strumming in the array and tow cable to prevent he dynamics of the towed array from appearing as signals in its sensors.

Other purposes and advantages of this invention will become apparent from a study of the following portion of this specification, the claims and the attached drawings.

BRIEF DESCRIPTION OF THE DRAWINGS

FIG. 3 is an enlarged side-elevational view of the connector end of the aft drogue module, with parts broken away, and parts taken in center line section.

FIG. 4 is an enlarged side-elevational view of the aft end of the aft drogue module, with parts broken away and parts taken in section.

FIG. 5 is an enlarged section, with parts broken away, taken generally long the line 5—5 of FIG. 3.

DESCRIPTION OF THE PREFERRED EMBODIMENT

Figure 1:
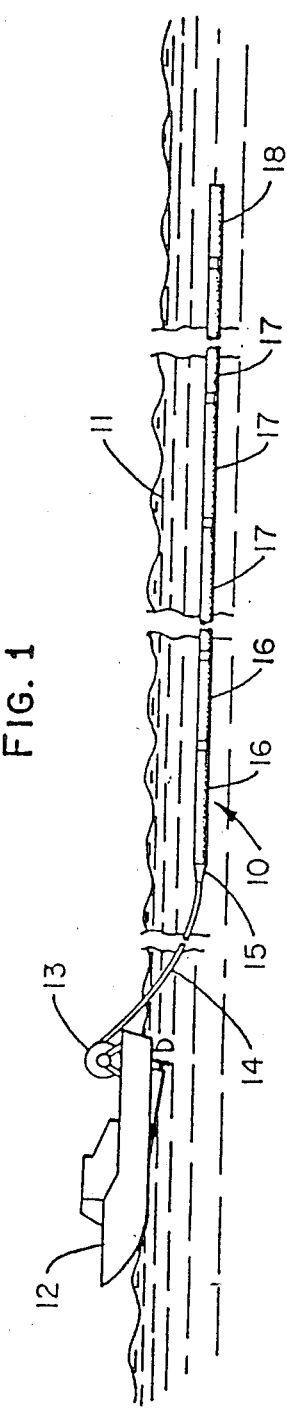
FIG. 1 is a side-elevational view of a boat towing an array having an aft drogue module in accordance with this invention.

Referring to FIG. 1 of the drawings, a sonar towed array assembly 10 is in operating position under the surface of a body of water 11 in tow behind a marine vessel 12. The vessel 12 may be a surface vessel as shown, but may be a submarine. The vessel 12 is equipped with a winch 13 having a spool on which the sonar towed array assembly 10 can be stowed when desired. The sonar towed array assembly 10 comprises a cable 14, which includes electrical signal conductors and a stress member such as a steel towing cable. The cable 14 may be attached to a nose cone 15 which is followed by one or more vibration isolation modules 16 and one or more acoustic modules 17. The sonar towed array assembly 10 terminates in aft drogue module 18.

Figure 2:
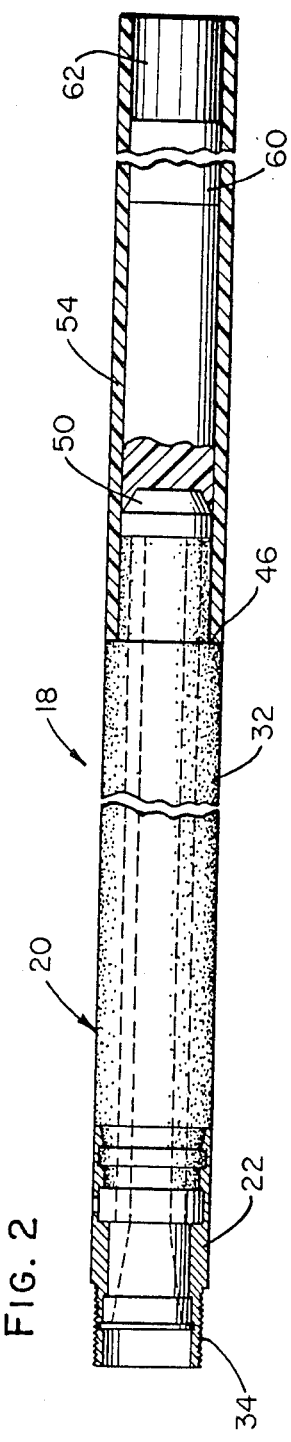
FIG. 2 is a side-elevational view of the aft drogue module in accordance with this invention, with the center broken away to foreshorten the length of the module and with parts broken away to show a center line section of the forward and aft portions of the drogue module.

The aft drogue module 18 is shown in FIG. 2. It comprises a body 20 which has a coupling half 22 at the forward end. In the preferred embodiment, the drogue module 18 is about 300 feet long in order to perform its functions and is 1 inch in diameter in order to match the remainder of the towed array. As is seen in FIG. 3, body 20 has an inner strength member 26. The strength member is preferably a ⅛ inch diameter briaded Kevlar rope. Extruded around the strength member 26 is a rubber tube 28. The material of tube 28 is thermoplastic rubberlike material, such as Uniroyal 5280, extruded with hardness of 70-80 Durometer A. Tube 28 is extruded with as high a pressure as possible to drive the thermoplastic rubber into the Kevlar braid. Outside diameter is about 0.80 inch. The purpose of rubber tube 28 is to absorb energy in flexure, and thus provide dampening for the system. Since the thermoplastic rubber has a lower density than water, the amount used can be adjusted to control the overall density. The strength member 26 must have sufficient tension applied thereto during the extrusion of tube 28 therearound to assure minimum slippage therebetween when tension is applied in use.

Open weave braid 30 is braided over the tube 28. Braid 30 is made of polyester, and the size of the thread or yarn is No. 3, minimum. The braid is sufficiently open that the pitch w between braid yarns is five to ten times the yarn diameter t, see FIG. 5. The braid sleeve 30 provides an anchor or gripping geature between tube 28 and the cover sleeve 32 extruded thereover. Cover sleeve 32 is extruded of polyurethane. Upjohn CPR 2103-80A or B.F. Goodrich 528311 polyurethane polyester is suitable. The sleeve 32 is extruded as a pressure extrusion in intimate contact with the tube 28 and braid 30. The finished sleeve extrusion 32 has a hardness of about 70-80 Durometer A. Sleeve 32 serves as a wear-resistant cover to resist abrasion during use and during stowage and deployment.

Coupling half 22, shown in detail in FIG. 3, requires no electrical connection and thus is purely a tension connector. It has suitable exterior configuration, such as threads 34, for joining to the next forward coupling half. Coupling half 22 contains termination ring 36 which is metallic, such as titanium and has an interior conical surface 38. Only the strength member 26 extends into termination ring 36. The strength member is separated and spread into conical configuration and is filled with a thermosetting resin. An epoxy resin is suitable, and a particular brand is Socketfast, which is a product of the Philadelphia Resins Corporation. The result is a conical plug 40, which includes the fibers of the strength member and which fills the conical termination ring 36. The termnation ring rests against the shoulder in the coupling half 22 so that tension in the strength member is transferred to the coupling half.

The end of body 20 is prepared for coupling in such a manner that the end of inner extruded tube 28 lies against ring 36, but the cover sleeve 32 is cut short thereof. After the plug 40 is completed, the skirt 42 of the coupling half is swaged down t o he diameter of sleeve 32. Thereafter, epoxy retaining ring 44 is injected into the space within the annular groove and skirt 42 and between ring 36 in the end of sleeve 32. Ring 44 helps retain the end of tube 28 in place so that it does not pull away from ring 36 during tension. In this way, tension securement is achieved.

The after end of the drogue module18 is shown at the right of FIG. 2 and in FIG. 4. The body 20 is long so that the entire drogue module 18 is in the order of 300 feet long. Sleeve 32 is cut back to define annular shoulder 46. The balance of the sleeve and tube 28 are cut back to shoulder 48. The strands of strength member 26 extend beyond shoulder 48 and are spread and filled with a polymer composition material to form plug 50. An epoxy is suitable material for plug 50. The plug 50 is shaped to define a circular cylindrical outer surface, the same diameter as the cut-down surface 52 in sleeve 32 to the right of shoulder 46.

Hose 54 is a nylon reinforced polyvinyl chloride hose having an inside diameter suitable to engage on surface 52 and an outside diameter the same as sleeve 32. It has a high damping coefficient. It is held in place by polyurethane adhesive on surface 52 and is filled with casting resin 58 which is preferably a silicone rubber thermoplastic material to provide resiliency.

Behind the casting resin 58, solid fill material 60 occupies most of the length of the hose 54. The aft end of th4e hose is plugged with polyvinyl chloride plug 62, which is knurled on the exterior to improve adhesion. Plug 62 is held in place by a suitable adhesive at the interface between the plug and the interior of hose 54. Solid fill material 60 is a synthetic polymer composition rubberlike material similar to the silicone thermoplastic rubber 28. It has a high damping coefficient. It preferably contains density reduction filler, such as hollow glass beads so that the overall density approximates sea water. Fill material 60 has only sufficient flexibility to let it wrap around the winch, when it is drawn on board, but is sufficiently stiff to inhibit whipping in the water as the drogue module is towed.

The overall effect of the drogue module is to be sufficiently stiff that it can be extruded from its winch out of its feed guide tube into the sea and, in that position, provide sufficient drag that the remainder of the towed array is drawn into the sea. In addition, the combination of materials is sufficient to withstand the tensile stresses and dampen whipping and strumming in the array and tow cable forward of the drogue module. The drogue module is near neutral buoyancy to maintain proper tow profile.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A drogue module for a towed sonar array, said drogue module comprising:
    a coupling at the forward end of said drogue module, said coupling having an interior cone surface which is divergent towards the forward end of said module;
    a body connected to said coupling, said body having a diameter substantially equal to said coupling and said body including a tensile strength member extending into and engaged within said coupling, said strength member being expanded to said conical surface and filled with a plug to prevent pulling of said strength member out of said coupling; and
    an aft hose connected to said body, said aft hose having a damper therein for damping whipping of said drogue module as it is towed through water.

2. The drogue module of claim 1 wherein said body comprises said strength member extending the length thereof with an extruded tube of rubberlike material thereon, together with an extruded cover sleeve thereover.

3. The drogue module of claim 2 wherein said cover sleeve is made of abrasion-resistant material.

4. The drogue module of claim 3 wherein said cover sleeve is made of thermoplastic synthetic polymer composition material.

5. The drogue module of claim 4 wherein said cover sleeve is made of material selected from the group consisting of polyurethane and polyester.

6. A drogue module for a towed sonar array, said drogue module comprising:
    a coupling at the forward end of said drogue module, said coupling having an interior cone surface which is divergent towards the forward end of said module;
    a body connected to said coupling, said body having a diameter substantially equal to said couplingtand said body including a tensile strength member extending throughout its length and extending into and engaged within said coupling, said strength member being expanded to said conical surface and filled with a plug to prevent pulling of said strength member out of said coupling, said body comprising an extruded tube of rubberlike material on said strength member together with an extruded cover sleeve of abrasion-resistant material thereover and an open weave sleeve position over said rubber tube and incorporated in said cover sleeve when said cover sleeve is extruded thereover; and
    an aft hose connected to said body, said aft hose havng a damper therein for damping whipping of said drogue module as it is towed through water.

7. The drogue module of claim 6 wherien said open weave tube is a braided tube.

8. The drogue module of claim 7 wherein said cover sleeve is made of thermoplastic synthetic polymer composition material.

9. The drogue module of claim 8 wherein said cover sleeve is made of material selected from the group consisting of polyurethane and polyester.

10. A drogue module for a twoed sonar array, said drogue module comprising:
    a coupling at the forward end of said drogue module, said coupling having an interior cone surface which is divergent towards the forward end of said module;
    a body connected to said coupling, said body having a diameter substantially equal to said coupling and said body including a tensile strength member extending into through the length of said body and extending into and engaged within said coupling, said strength meember being expanded to said conical surface and filled with a plug to prevent pulling of said strength member out of said coupling; and
    an aft hose connected to said body, said strength member extending into said hose and secured therein said aft hose having a damper therein for damping whipping of said drogue module as it is towed through water.

11. The drogue module of claim 10 wherein said strength member is expanded in said hose and is filled to form a plug in engagement with said hose.

12. The drogue module of claim 11 wherein said hose aft of said strength member plug contains resilient damping material within said hose.

13. The drogue module of claim 12 wherein said resilient damping material within said hose contains sufficient density reducing filler that said hose and its contents are near neutral buoyancy in sea water.

14. The drogue module of claim 10 wherein said resilient damping material within contains sufficient density reducing filler that said hose and its contents are near neutral buoyancy in sea water.

15. A drogue module comprising:
    a coupling at the forward end of said drogue module for coupling to a towed sonar array;
    a body secured to said coupling, said body having substantially the same diameter as said coupling, said body comprising a longitudinal strength member extending throughout the length of said body, a tube of rubberlike material extruded over said strength member for the entire length of said body in intimate contact with said body and a cover sleeve of abrasion-resistant material extruded over said rubber tube for the entire length of said body; and
    a damping tail secured to the aft end of said body.

16. The drogue module of claim 15 wherein an open weave structure is positioned at the interface between said rubberlike tube and said sleeve to aid in adhesion between said rubberlike tube and said sleeve.

17. The drogue module of claim 15 wherein said tail is a tubular outer covering in which is contained damping material.

18. The drogue module of claim 17 wherein said damping material is of moderate flexibility so that said tail is longitudinally more stiff than said body.

19. The drogue module of claim 18 wherein said strength member of said body extends into said tube and is expanded into contact with said tube to aid in retaining said tail on said body.

* * * * *

UNITED STATES PATENT AND TRADEMARK OFFICE
CERTIFICATE OF CORRECTION

PATENT NO. : 4,734,891

DATED : March 29, 1988

INVENTOR(S) : G. A. McGowan et al.

It is certified that error appears in the above-identified patent and that said Letters Patent is hereby corrected as shown below:

Column 2, lines 48-49: replace "inventiontprovide" with --invention to provide--.

Column 4, line 19: replace "t o he" with --to the--.

Column 5, line 50 (Claim 6): replace "couplingtand" with --coupling and--.

Column 5, line 60 (Claim 6): replace "position" with --positioned--.

Column 6, line 7 (Claim 10): replace "twoed" with --towed--.

Column 6, line 37 (Claim 14): between "within" and "contains" insert --said hose--.

Signed and Sealed this

Fourteenth Day of March, 1989

Attest:

DONALD J. QUIGG

Attesting Officer

Commissioner of Patents and Trademarks